United States Patent [19]
Boyce et al.

[11] Patent Number: 5,741,574
[45] Date of Patent: Apr. 21, 1998

[54] TRUSS REINFORCED FOAM CORE SANDWICH

[75] Inventors: Joseph Santin Boyce, Hanover; Glenn Alexander Freitas, Foxboro; Thomas Gerard Campbell, Concord, all of Mass.

[73] Assignee: Foster-Miller, Inc., Waltham, Mass.

[21] Appl. No.: 434,034

[22] Filed: May 3, 1995

Related U.S. Application Data

[63] Continuation of Ser. No. 58,283, May 4, 1993, abandoned.

[51] Int. Cl.$^6$ .............. B32B 5/02; B32B 5/18; B32B 7/08
[52] U.S. Cl. .............. 428/119; 428/71; 428/86; 428/112; 428/223; 428/309.9; 428/317.9
[58] Field of Search ............ 428/71, 72, 73, 428/86, 92, 96, 102, 112, 116, 119, 223, 309.9, 317.9, 105

[56] References Cited

U.S. PATENT DOCUMENTS

| | | | |
|---|---|---|---|
| 2,557,668 | 6/1951 | Lincoln | 154/42 |
| 3,031,349 | 4/1962 | Dritz | 156/513 |
| 3,122,465 | 2/1964 | Keller et al. | 156/93 |
| 3,146,141 | 8/1964 | Woodland | 156/73 |
| 3,243,332 | 3/1966 | Dritz | 156/513 |
| 3,328,218 | 6/1967 | Hoppe et al. | 156/166 |
| 3,357,090 | 12/1967 | Tiffany | 29/470 |
| 3,367,809 | 2/1968 | Soloff | 156/73 |
| 3,394,283 | 7/1968 | Mims | 228/1 |
| 3,401,861 | 9/1968 | Folk | 228/1 |
| 3,440,117 | 4/1969 | Soloff et al. | 156/73 |
| 3,460,238 | 8/1969 | Christy et al. | 29/481 |
| 3,480,492 | 11/1969 | Hauser | 156/73 |
| 3,538,668 | 11/1970 | Anderson | 52/615 |
| 3,579,411 | 5/1971 | Mackie et al. | 161/53 |
| 3,666,599 | 5/1972 | Obeda | 156/380 |
| 3,719,212 | 3/1973 | Emerson et al. | 139/387 |
| 3,750,355 | 8/1973 | Blum | 52/309 |
| 3,837,985 | 9/1974 | Chase | 161/55 |
| 3,900,651 | 8/1975 | Noyes | 428/86 |
| 4,027,370 | 6/1977 | Bachar | 29/818 |
| 4,109,435 | 8/1978 | Loyd | 52/309.1 |
| 4,136,226 | 1/1979 | Gilman | 428/315 |
| 4,172,916 | 10/1979 | Watson | 428/86 |
| 4,247,345 | 1/1981 | Kidija et al. | 156/73.4 |
| 4,274,901 | 6/1981 | Elber | 156/242 |
| 4,299,871 | 11/1981 | Forsch | 428/104 |
| 4,328,272 | 5/1982 | Maistre | 428/105 |
| 4,350,728 | 9/1982 | Huang et al. | 428/105 |
| 4,361,613 | 11/1982 | Bogner et al. | 428/119 |
| 4,373,653 | 2/1983 | Salzer et al. | 228/104 |
| 4,426,414 | 1/1984 | Wilkerson | 428/102 |
| 4,469,470 | 9/1984 | Brily | 428/119 |
| 4,528,051 | 7/1985 | Heinze et al. | 156/92 |
| 4,556,591 | 12/1985 | Bannink, Jr. | 428/43 |
| 4,556,592 | 12/1985 | Bannink, Jr. | 428/43 |
| 4,567,076 | 1/1986 | Therrien | 428/102 |
| 4,582,740 | 4/1986 | Zucher | 428/88 |

(List continued on next page.)

FOREIGN PATENT DOCUMENTS

| | | |
|---|---|---|
| 0009403 | 4/1980 | European Pat. Off. |
| 3027217 | 2/1982 | Germany . |
| 3147228 A1 | 6/1983 | Germany . |
| 3246803 A1 | 6/1984 | Germany . |
| 3531519 | 3/1986 | Germany . |
| 55-121027 | 9/1980 | Japan . |
| 2 040 805 | 1/1980 | United Kingdom . |

*Primary Examiner*—Paul J. Thibodeau
*Assistant Examiner*—Vivian Chen
*Attorney, Agent, or Firm*—Iandiorio & Teska

[57] ABSTRACT

A reinforced foam core sandwich structure including opposing face sheets, a foam core therebetween, and tow members encapsulated within the foam core and extending between the opposing face sheets to form a combined foam/tow member core wherein the compressive strength or shear strength of the combined foam/tow member core is greater than the compressive strength or shear strength, respectively, of the foam core alone or the tow members alone forming a support structure within the foam core between the face sheets.

5 Claims, 8 Drawing Sheets

U.S. PATENT DOCUMENTS

| | | | |
|---|---|---|---|
| 4,622,091 | 11/1986 | Letterman et al. | 156/286 |
| 4,637,947 | 1/1987 | Maekawa et al. | 428/68 |
| 4,679,291 | 7/1987 | Schmeal et al. | 29/432 |
| 4,761,871 | 8/1988 | O'Connor et al. | 29/432.1 |
| 4,786,343 | 11/1988 | Hertzberg | 156/93 |
| 4,798,639 | 1/1989 | Yamaguchi | 156/73.1 |
| 4,808,461 | 2/1989 | Boyce et al. | 428/199 |
| 4,863,551 | 9/1989 | Ogura | 156/378 |
| 4,910,067 | 3/1990 | O'Neill | 428/139 |
| 5,021,280 | 6/1991 | Farnworth et al. | 428/102 |
| 5,102,723 | 4/1992 | Pepin | 428/223 |
| 5,108,830 | 4/1992 | Osaka | 428/257 |
| 5,345,738 | 9/1994 | Dimakis | 52/309.9 |
| 5,466,506 | 11/1995 | Freitas et al. | 428/105 |

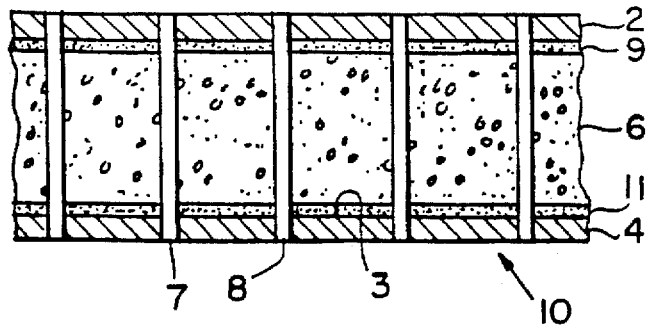
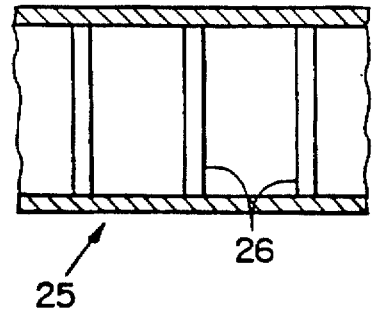
FIG. 1
FIG. 3
PRIOR ART
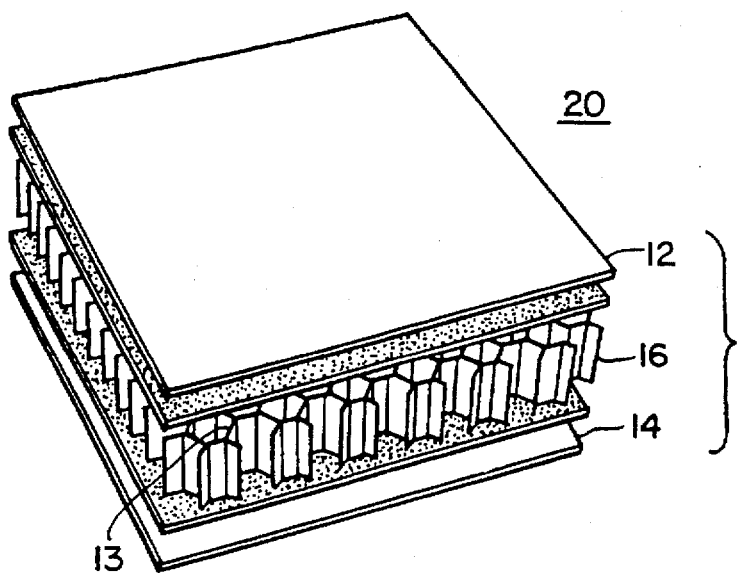
FIG. 2
PRIOR ART
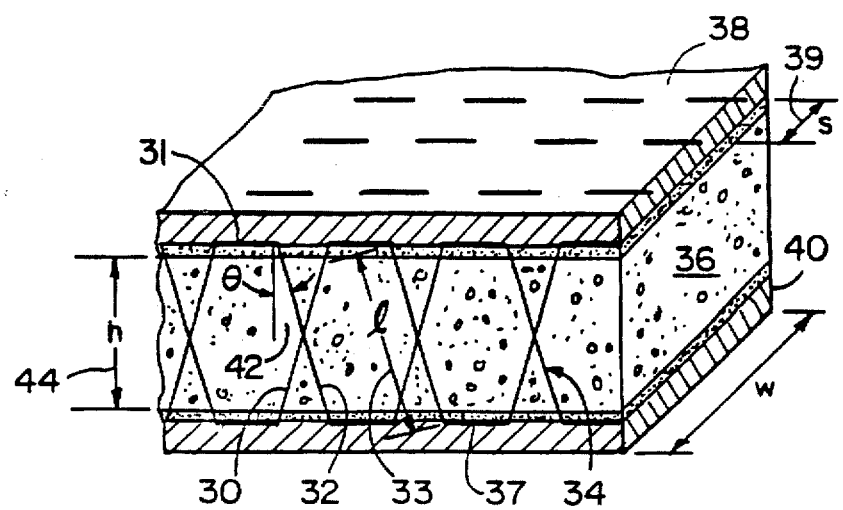
FIG. 4

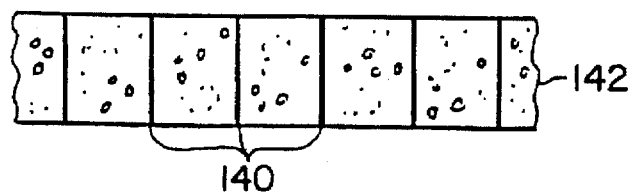
FIG. 12A
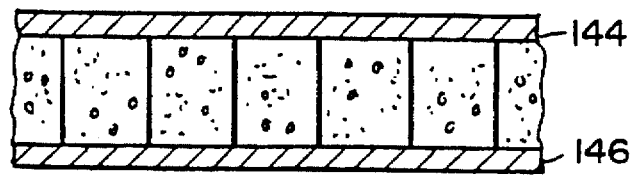
FIG. 12B
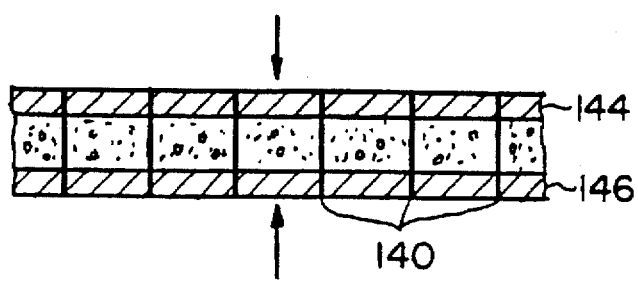
FIG. 12C
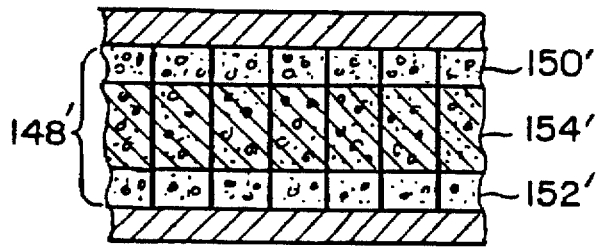
FIG. 13A
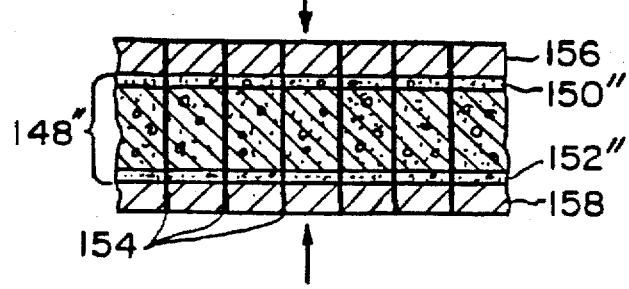
FIG. 13B
FIG. 14

TRUSS REINFORCED FOAM CORE SANDWICH

This is a continuation of application Ser. No. 08/058,283, filed May 4, 1993, abandoned.

FIELD OF INVENTION

This invention relates to a truss reinforced foam core (TRFC) sandwich structure which offers improvements over honeycomb core sandwich structures, foam core sandwich structures, and truss core sandwich structures.

BACKGROUND OF INVENTION

Sandwich structures are extensively used in the aerospace industry as well as other applications and implementations where weight reduction is a significant factor. One conventional sandwich structure includes thin face sheet laminates and a honeycomb core. Other configurations include spaced stringer or ribbed configurations and even columnar core members oriented at right angles and secured to the outer face sheets. (U.S. Pat. No. 3,328,218). Many disadvantages exist, however, with respect to these prior art structures.

Honeycomb core structures have been shown to be susceptible to moisture intrusion because of the many open cells inherent in the honeycomb core. Non-visible face sheet damage is sufficient to create a path for moisture intrusion. When moisture, condensing on the outside of an aircraft wing skin fabricated with honeycomb core panels is forced into the honeycomb core by the pressure differential between the sandwich interior and the atmosphere during descent, the moisture becomes trapped creating corrosion, property degradation and eventually a significant weight penalty resulting in costly corrective action. Corrosion of aluminum honeycomb cores and debonding from repeated freeze/thaw cycles are other known problems.

Moreover, additional problems occur due to impact damage from accident, tool drop, hail strike, and the like. The honeycomb core may be crushed proximate the point of impact even though the face sheet suffers no visual damage. And, resulting core shear failure may extend over even a greater area. Such core damage may result in face sheet buckling and delamination under stress. Visual inspection of an aircraft wing may not show the underlying core damage which may significantly lower design tolerances.

Therefore, honeycomb core structures, although efficient because of a high strength to weight ratio, are not suitable for all applications. Similar problems are inherent in the other designs discussed above.

Closed cell foam core structures limit moisture intrusion and improve impact resistance; however, they suffer from low specific shear strength relative to honeycomb core materials. A structure including only columnar core members attached at right angles and secured to the outer face sheets may buckle under compression but more importantly such an arrangement also characteristically exhibits poor shear strength.

Therefore, these core materials do not offer the high specific strength needed for lightweight structures in conjunction with the impact resistance and low moisture intrusion features required for reliable use in primary load carrying members.

SUMMARY OF THE INVENTION

It is therefore an object of this invention to provide an improved reinforced foam core sandwich structure.

It is a further object of this invention to provide such a reinforced foam core sandwich structure which is stronger than a foam core or columnar members alone, and has a structural efficiency comparable to that of honeycomb cores and which also is not susceptible to moisture intrusion.

It is a further object of this invention to provide such a reinforced foam core sandwich structure which provides increased interlaminar strength and damage tolerance with no reduction to in-plane properties.

It is a further object of this invention to provide such a reinforced foam core sandwich structure which eliminates premature core buckling.

It is a further object of this invention to provide such a reinforced foam core sandwich structure which combines the advantages of both truss and foam cores.

It is a further object of this invention to provide such a reinforced foam core sandwich structure which overcomes the reliability problems associated with aluminum and other honeycomb sandwich core constructions for aircraft applications.

It is a further object of this invention to provide such a reinforced foam core sandwich structure which improves compressive load transfer, improves damping, and prevents delamination/debonding of face sheet laminates in composite hull structures.

It is a further object of this invention to provide method(s) of fabricating a reinforced foam core sandwich structure.

It is a further object of this invention to provide such method(s) of fabricating a reinforced foam core sandwich structure which is compatible with existing materials and fabrication processes.

It is a further object of this invention to provide such method(s) of fabricating a reinforced foam core sandwich structure which allow the use of known stitching techniques to fabricate a reinforced foam core structure.

It is a further object of this invention to provide such a reinforced foam core sandwich structure and a method of making the same which allows the use of a variety of materials depending on the specific application.

It is a further object of this invention to provide such a reinforced foam core sandwich structure and method which increases the structural integrity of the face sheets and also the structural integrity of the face sheet/core interface.

It is a further object of this invention to provide such a reinforced foam core sandwich structure which facilitates the use of fasteners without added reinforcement.

This invention results from the realization that impact and moisture resistance of a sandwich structure can be improved by the use of a foam core and further that incorporating within the foam core a truss structure composed of fiber tows increases the strength of the sandwich panel over a foam or truss core alone and the further realization that the fiber tow members can be laminated within the face sheets to increase the structural integrity of the face sheets and the foam core/face sheet interface and also to further increase the shear strength of the resulting sandwich panel.

This invention features a reinforced foam core structure comprising opposing face sheets, a foam core therebetween, and a plurality of tow members encapsulated within the foam core forming a support structure therein, wherein each tow member extends at least between the opposing face sheets. This structure offers improvements over a foam core alone and a truss core alone. The foam core increases impact and moisture resistance and the truss core increases the shear strength and compressive strength of the sandwich panel.

Furthermore, since the tow members are surrounded by foam, they are prevented from buckling.

The tow members may reside perpendicularly or at one or more angles between the face sheets or may form a truss structure within the foam core for reinforcing the shear strength of the sandwich structure. The resulting truss structure may include a number of x-braced chords and web members between the plies of each face sheet for transferring tensile force received by the tow members to the face sheets.

The tow members in any configuration may extend from at least partially within one laminated face sheet to at least partially within the opposing laminated face sheet for increasing the interlaminar strength of the sandwich structure and the structural integrity of the face sheets and the foam core/face sheet interface. Continuous lengths of fiber material may be stitched at least partially between the laminae of the opposing face sheets using known stitching techniques and apparatus.

This invention also features a method of fabricating a reinforced foam core sandwich structure comprising disposing a plurality of reinforcing fibers in a foam core, assembling face sheets on the opposing faces of the foam core, and compressing the foam core to drive the reinforcing fibers into the face sheets. In this embodiment, the foam core may include outer compactable layers of a first density and an interior layer of a second density greater than the first density. If the face sheets are dry fabric, the method may further include wetting the fabric with resin after compressing the foam core and then curing the face sheets. If the face sheets are a prepreg material, the method further includes curing the structure after compressing the foam core.

This invention also features a method of fabricating a truss reinforced foam core sandwich structure comprising assembling at least one ply of face sheet material on the opposing faces of a foam core, stitching lengths of fiber tows through the face sheet material and within the foam core producing a truss network therein, and laying up additional plies of face sheet material on the opposing faces of the foam core. In this embodiment, if the face sheet material is a prepreg glass fabric, the method includes the additional step of curing the face sheet material after lay up of the additional plies. If the face sheet material is a dry woven fabric, the method further includes the additional step of impregnating the fabric with resin and curing after layup of the additional plies.

BRIEF DESCRIPTION OF DRAWINGS

Other objects, features and advantages will occur to those skilled in the art from the following description of a preferred embodiment and the accompanying drawings, in which:

FIG. 1 is a cross sectional schematic view of a reinforced foam core sandwich structure according to this invention;

FIG. 2 is a three dimensional schematic view of a prior art honeycomb core sandwich structure;

FIG. 3 is a cross sectional view of a prior art columnar core sandwich structure;

FIG. 4 is a three dimensional partial schematic view of a truss reinforced foam core sandwich structure according to this invention;

FIGS. 12A–12C are schematic cross-sectional diagrams showing one method of fabricating a reinforced foam core sandwich structure according to this invention;

FIGS. 13A–13B are schematic cross sectional diagrams of another method of fabricating a reinforced foam core sandwich structure according to this invention;

FIG. 14 is a block diagram of the processing steps for fabricating a stitched truss reinforced sandwich structure according to this invention;

DISCLOSURE OF PREFERRED EMBODIMENT

Figure 5:
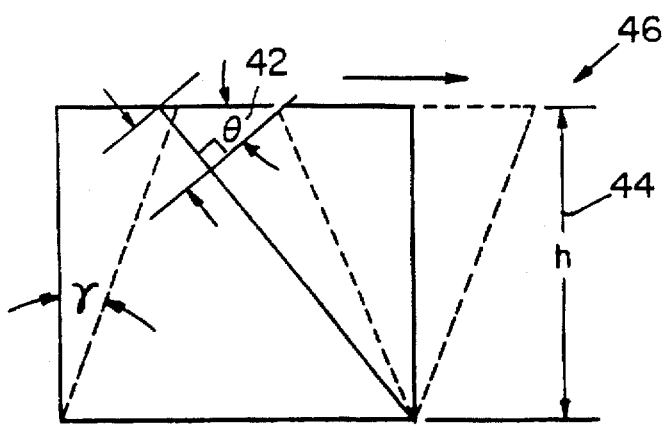
FIG. 5 is a schematic strain diagram of a unit cell of the truss reinforced foam core sandwich structure of FIG. 4.

This invention may be accomplished by a sandwich panel 10, FIG. 1, comprising opposing spaced face sheets 2 and 4, foam core 6 therebetween, and a plurality of tow members 7 and 8 encapsulated within foam core 6 forming a support structure therein. As shown, each tow 7, 8 extends, in this embodiment, into opposing face sheets 2 and 4. Adhesive layers 9 and 11 secure face sheets 2 and 4 to foam core 6.

Tow members 7 and 8 act as slender columns which are inherently strong in compression and yet in this embodiment, encapsulated in foam core 6, are also prevented from buckling which could occur in the absence of foam core 6. Also, as discussed infra, a closed cell foam core 6 resists moisture intrusion. Furthermore, tow members 7 and 8 extending into face sheets 2 and 4 increases the structural integrity of the face sheet/core interface 3 and also the delamination resistance of face sheets 2 and 4.

Prior art open cell honeycomb core 16 structure 20, FIG. 2, including face sheets 12 and 14, as discussed above in the Background of Invention, is susceptible to moisture intrusion, and impact damage. The same is true of fiber truss core sandwich truss structure 25, FIG. 3, which in addition lacks the strength needed for primary structures because of the tendency for premature buckling of columnar members 26.

In this invention, impact damage is reduced since foam core 6, FIG. 1 may be manufactured from a variety of thermoplastic and thermoset polymers, having properties ranging from soft and pliable to rigid and brittle. Moreover, closed cell foams exhibit very low moisture absorption since there are no cavities to retain pockets of water as in the cells of honeycomb structures. Water intrusion and retention, and freeze/thaw damage are nonexistent in foam. Foam also does not suffer from corrosion inherent to metallic honeycomb structures. Additionally, because the foam acts as a continuous elastic support for the face sheets, low velocity impact energy can be absorbed and redistributed within the foam. The continuous bond at the foam core/face sheet interface 3, FIG. 1, offers added damage tolerance as compared to the small area available for honeycomb bonding, namely the top edges of each cell as shown at 13, FIG. 2. And, tow members 7, 8, are supported against buckling by the presence of foam core 6 encapsulating each tow in a fixed position between the face sheets 2 and 4.

If shear stress is a consideration in a given application, sandwich panel 29, FIG. 4, includes, according to this invention x-braced fiber chord tow members 30, 32 between web 31 and Web 37 forming truss structure 34 within foam core 36 between face sheets 38 and 40. The tow members are orientated at an angle forming an interlocking truss structure 34 within the foam. The fiber tows 30, 32 may be stitched so as to interlock, as shown for web 31, with a woven fabric ply of face sheet 38 placed on the foam as further described below. This both maintains fiber position and aids in load transfer between fibers especially when a given tow fiber is in tension. The fabric could be dry woven and could be subsequently impregnated with resin or it could be preimpregnated and B-staged (prepregged) with resin which locks the structure and provides a deliverable core ready for subsequent layup and bonding of the face sheet laminates. When the sandwich structure is cured, a portion of each stitch loop as shown for web 31, is laminated into the face sheets lying between the woven surface ply and the rest of the laminate. This provides a good anchorage to transfer the shear load and also insures that the structural integrity does not depend solely on an adhesive bond to the core (as is the case with honeycomb).

This embodiment of the present invention is based on truss theory where the load is transferred and shared between contiguous truss members. The bending loads are reacted by the face sheets and the core reacts to the shear loads. The applied shear is reacted to in parallel by both the core and truss structure in proportion to the relative shear stiffness. The shear stiffness of the truss is determined by referencing the unit cell of the structure, shown in FIG. 5. The total shear modulus $G_{total}$ for structure 29 can be shown to be given by:

$$G_{total} = G_{foam} + \frac{2S}{h} EA \sin\theta \cos^2\theta \quad (1)$$

where $G_{foam}$ is the shear modulus of foam core 36, EA is the axial fiber tow stiffness in lb-in$^2$, $\theta$ is shown at 42 in FIGS. 4 and 5 as the angle of stitching, h the foam thickness FIG. 4, and s is the fiber spacing as shown at 39. Fiber length l is h/cos $\theta$ as shown at 33 in FIG. 4, and $\Delta$l=h$\gamma$sin $\theta$, where $\gamma$=the shear strain on unit cell 46, FIG. 5.

The overall shear strength $F_{su}$ of the system is determined from the minimum strength based on three critical failure modes: foam 36 shear $F_{sufoam}$, fiber tow 30 compression and fiber tow 32 buckling $F_{suFiber}$. The shear strength for each failure mode is given below, and the minimum value determines the allowable for structure 30:

$$F_{su} + F_{sufoam}\left(\frac{G_{total}}{G_{foam}}\right) \quad (2)$$

or:

$$F_{su} = F_{sufiber} \frac{2S}{h} A\cos\theta \left(\frac{G_{total}}{G_{total} - G_{foam}}\right) \quad (3)$$

and:

$$F_{su} = P_{cr} \frac{2S}{h} \cos\theta \left(\frac{G_{total}}{G_{total} - G_{foam}}\right) \quad (4)$$

$$P_{cr} = \frac{\Pi^2 EI}{\rho^2}\left(m^2 + \frac{k\rho^4}{m^2\Pi^2 EI}\right) \quad (5)$$

where $P_{cr}$ is the critical load and $$\frac{k\rho^4}{\Pi^4 EI} = m^2(m+1)^2 \quad (6)$$

EI is the fiber bending stiffness, k is the foundation modulus of the foam core, and m is the integer number of half wavelengths in the buckled mode shape.

Optimization of the concept is illustrated by an example using a Rohacell 51WF, Divinycell or Klegecel closed cell foam with the properties shown in Table 1.

TABLE 1

| Grade | Rohacell | | Divinycell | | Klegecel Polimex | |
| --- | --- | --- | --- | --- | --- | --- |
| | 51 WF | 71 WF | HT 50 | HT 70 | TR-55 | TR-75 |
| Density (lb/ft$^3$) | 3.25 | 4.68 | 3.1 | 4.4 | 3.5 | 4.7 |
| Tensile strength (psi) | 2.32 | 3.9 | 160 | 260 | 170 | 308 |
| Compressive strength (psi) | 116 | 246 | 100 | 160 | 108 | 154 |
| Flexural strength (psi) | 232 | 420 | 115 | 230 | 136 | 271 |
| Shear strength (psi) | 116 | 188 | 73 | 116 | 98 | 135 |
| Modulus of elasticity (psi) | 10,875 | 15,225 | — | — | 8,285 | 13,635 |
| Shear modulus | 2,755 | 4,205 | 2,465 | 3,625 | 2,944 | 4,162 |
| Thermal stability °F. | up to 360° F. | | up to 260° F. | | 250° F. | |

Fiber spacing of eight fibers/in. was used for fiberglass tows of 0.030 in. total diameter. The stitch angle was varied and the shear strength in each failure mode was plotted. Between stitch angles of about 20°–70°, 48, FIG. 6, the fibers are primarily loadpaths for core shear and the overall core failure is controlled by fiber failure. Below 20 degrees, 50, and above 70 degrees, 52, the stiffness of the fiber load path decreases rapidly and the foam shear strength is controlling.

Figure 7:
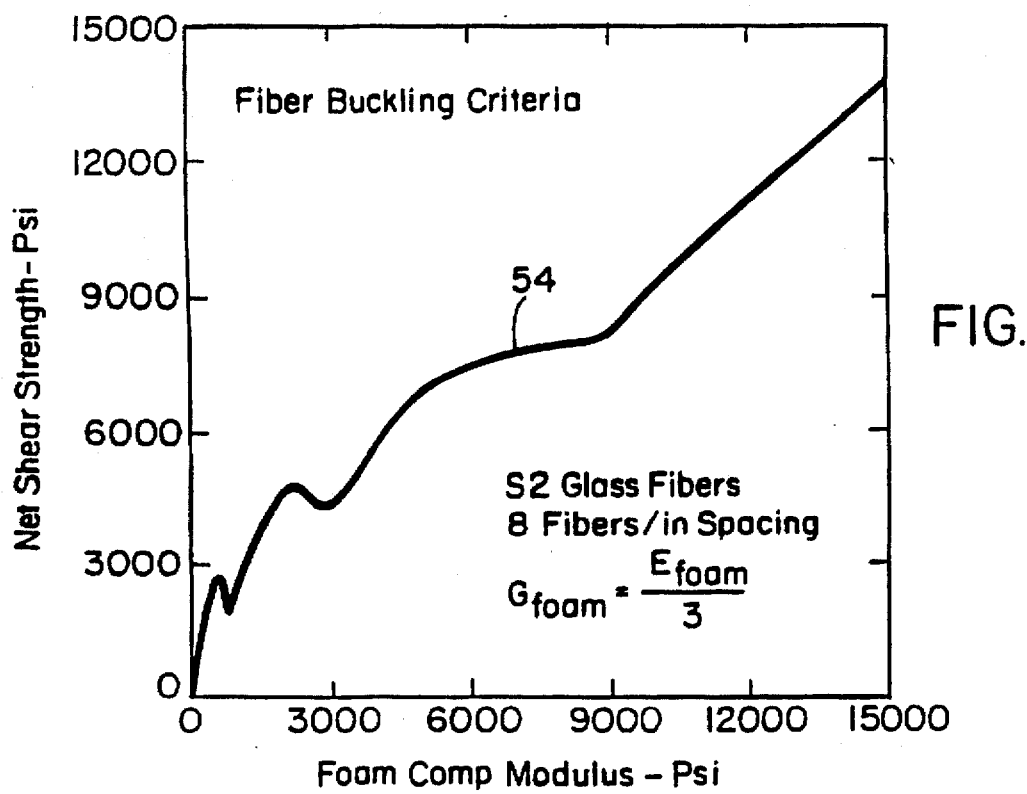
FIG. 7 is a graphical representation showing net shear strength as a function of foam compressive strength.

At 0 and 90 degrees the fibers have zero effective stiffness in shear and the overall core shear strength and stiffness are equal to that of the foam alone. A 1.0 in. core height results in truss buckling being non-critical, as shown in FIG. 7. The waviness of curve 54 is due to variations in the buckled mode shape as the foam stiffness provides increasing support to the fiber.

Figure 6:
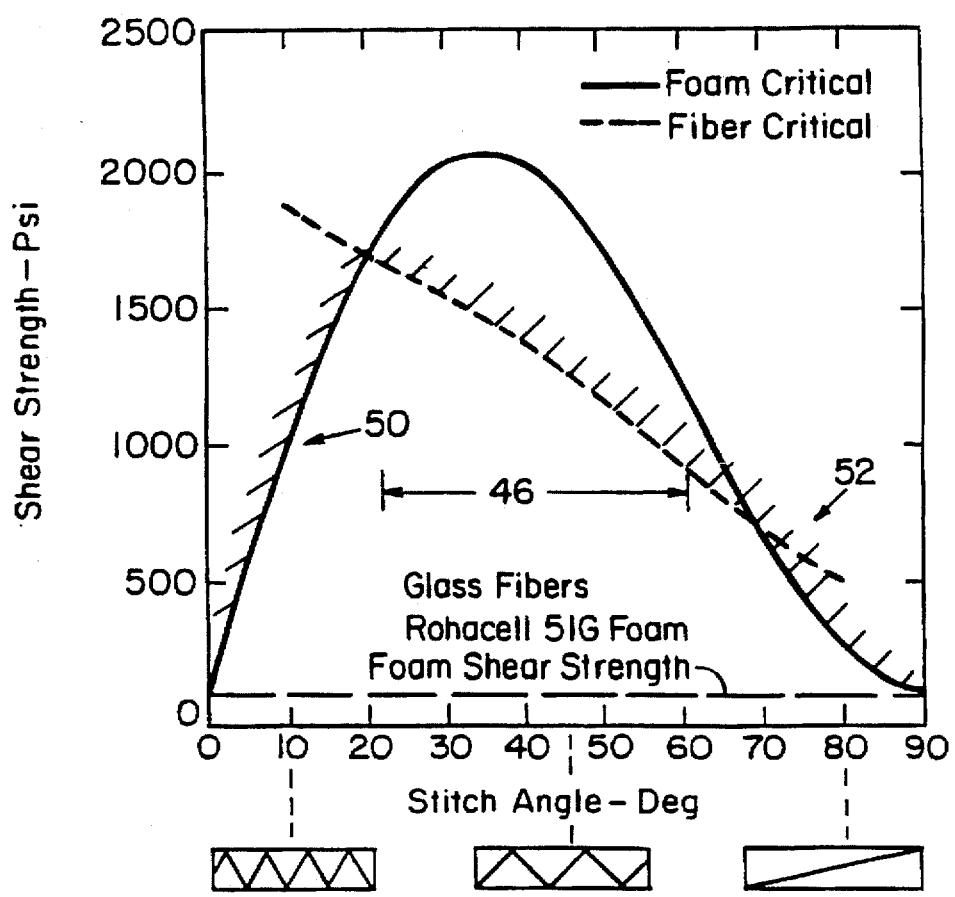
FIG. 6 is a graphical representation showing core shear strength as a function of stitch angle for the sandwich structure of this invention.
Figure 8:
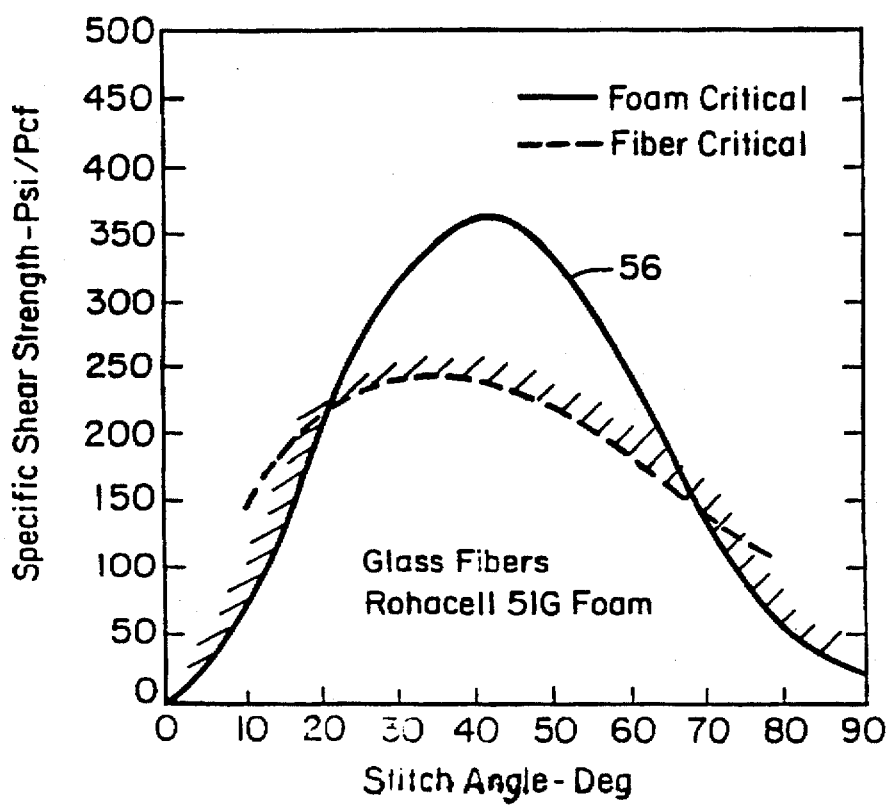
FIG. 8 is a graphical representation showing specific shear strength as a function of stitch angle.
Figure 9:
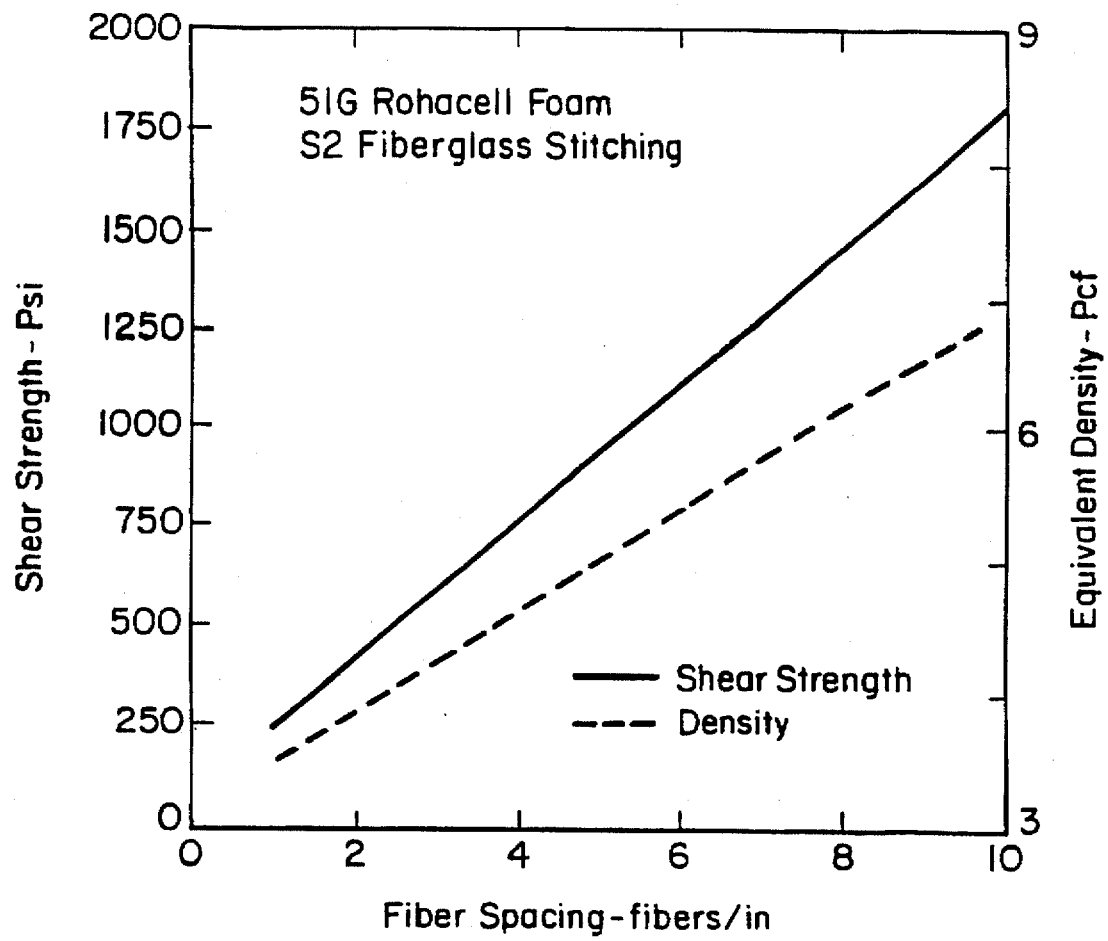
FIG. 9 is a graphical representation showing shear strength as a function of fiber spacing.

The shear strength shown in FIG. 6 is the maximum for a stitch angle of about 20 degrees and is roughly 15 times that of the foam by itself, whereas the weight is less than two times. The density of the core increases as the fiber angle decreases since more fiber is included per inch (the number of truss cells per unit length increases). The optimum specific shear strength occurs at a higher angle of 35 to 40 degrees at 56 as shown in FIG. 8. The effect of fiber spacing is critical in developing the optimum shear strength. It may be possible to develop adequate shear strength at much reduced spacing. This effect is shown in FIG. 9.

Figure 10:
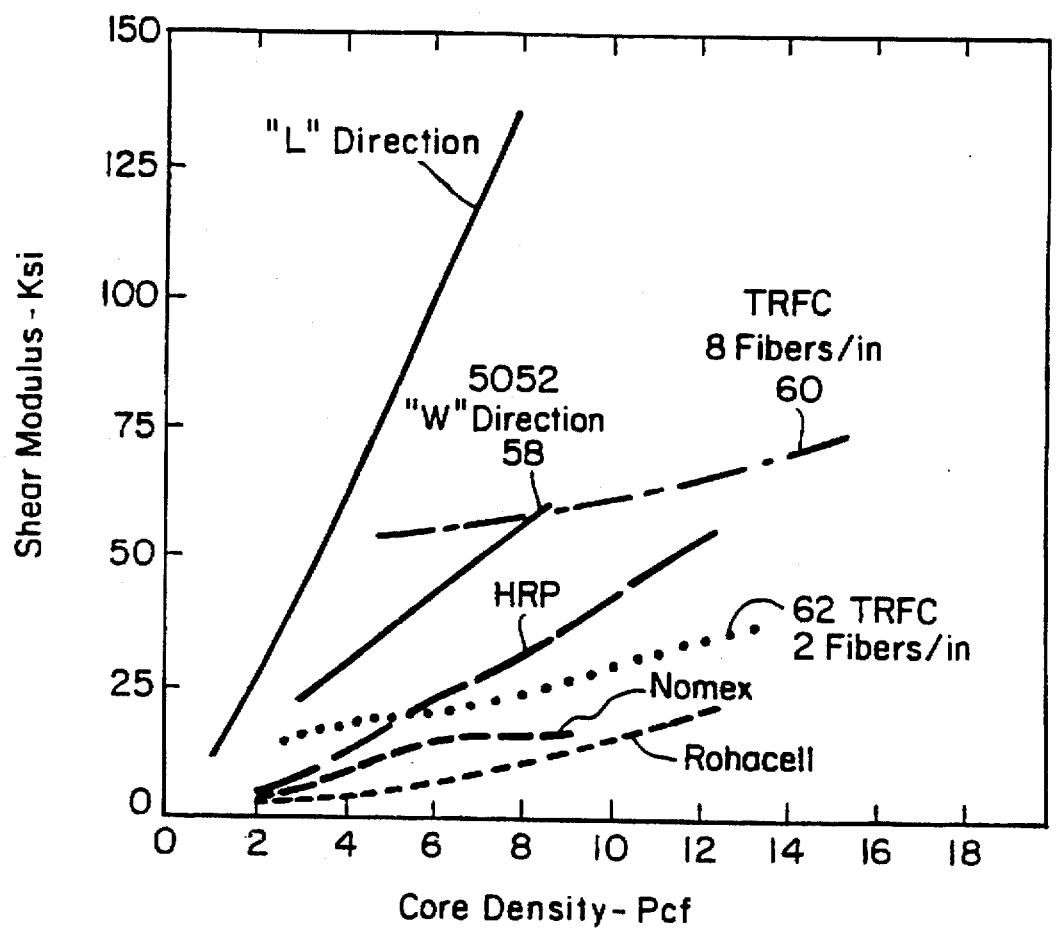
FIG. 10 is a graphical comparison of the performance of the TRFC according to this invention versus various honeycomb and unreinforced foam cores.

The effect of fiber angle on shear modulus is shown in FIG. 10. The stiffness of an aluminum core 58 is not reached by the structure of this invention shown at 60 and 62 for densities of 8 fibers/in. and 2 fibers/in. respectively, but the modulus does not usually control the overall sandwich design. A summary comparison of the properties of foam alone, the truss reinforced foam core of this invention, and aluminum honeycomb is provided in Table 2:

TABLE 2

| CORE | SHEAR STRENGTH (psi) | SHEAR MODULUS (psi) | DENSITY (pcf) |
|---|---|---|---|
| Foam alone (Rohacell 51WF) | 114 | 2990 | 4.7 |
| Truss reinforcing foam core (8 ends/in.) | 1650 | 43,500 | 8.0 |
| Honeycomb (5052 Al honeycomb) | 700 | 130,000 | 8.0 |

Figure 11:
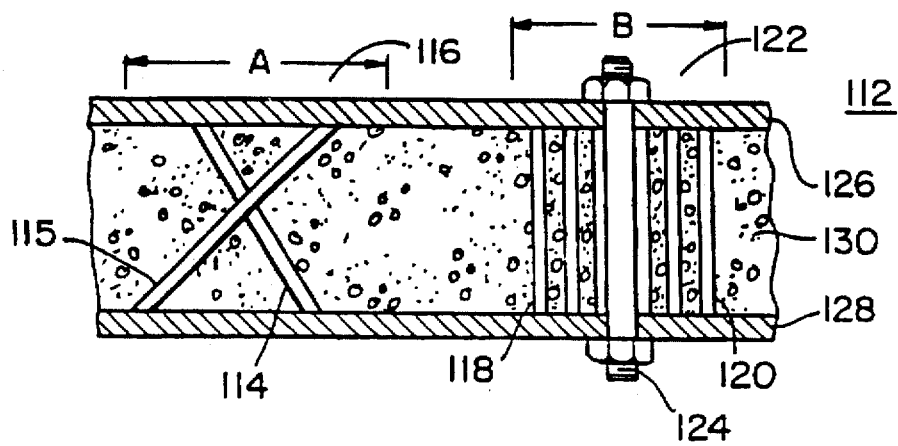
FIG. 11 is a cross sectional diagram of another embodiment of a reinforced foam core sandwich structure of this invention.

The toughness of the foam core and the lead sharing with tough fibers such as fiberglass will limit impact damage and virtually eliminate moisture intrusion. ACC. In another embodiment, a given sandwich panel may be fabricated with both angled and vertically extending tow members for localized reinforcing strength. For example, sandwich panel 112, FIG. 11, includes angled tows 114 and 115 for increased shear strength in region A, 116, as discussed above, and also vertically extending tow members 118, 120 for increased compressive strength in region B, 122 where fastening bolt 124 will place localized pressure on face sheets 126 and 128. Unlike honeycomb core panels 20, FIG. 2, which require spacers, grommets, or other like inserts in order to prevent damage to core 16 and face sheets 12, 14, the present invention provides adequate compressive strength for such fasteners and tows 118, 120 are prevented from buckling since they are bound within foam core 130, as discussed above.

Fabrication of the sandwich panels according to this invention may be accomplished as follows.

In a first embodiment, fiber tows 140, FIG. 12A, are manually placed in or automatically inserted into foam core 142 either perpendicularly as shown or at one or more various angles. Face sheets 144, 146 are then placed on each side, FIG. 12B. Application of pressure, FIG. 12C, compacts the foam and drives tows 140 at least partially into face sheets 144, 146.

In a second embodiment, foam core 148, FIG. 13A, of varying density and compactability is used. Outer layers 150, 152 are of a low density and compactable such as Rohacell 31 IG. Middle layer 154, however, is a more structurally rigid foam of a higher density and not as easily compactable such as Rohacell 51 IG. Application of heat, pressure, or both, FIG. 13B, compacts outer layers 150" and 152" driving tows 154 through face sheets 156 and 158. In both embodiments, the presence of tows 140, FIG. 12C and 154, FIG. 13B, driven into the face sheets increases the delamination resistance of the core/face sheet interface and also the delamination resistance of the face sheets since the tows extend through the thickness of the face sheets structurally reinforcing the layers of individual plies.

Figure 15:
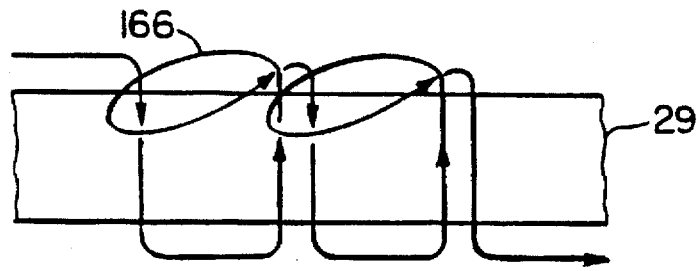
FIGS. 15–16 are schematic diagrams of stitch patterns which may be used in the fabrication of a reinforced foam core structure according to the processing steps of FIG. 14.
Figure 16:
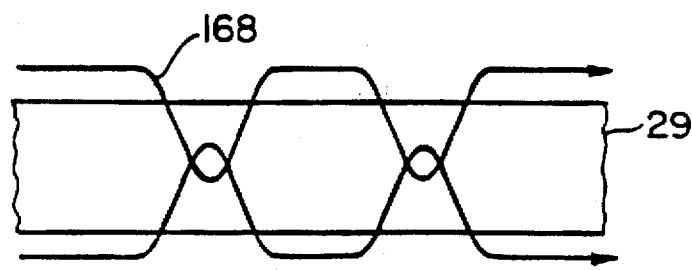

For the embodiment shown in FIG. 4, as well as other truss configurations, stitching is the preferred method of placing tows 30, 32 in foam core 36 as well as within face sheets 38, 40. First, one or more plies of each face sheet are assembled with the foam core, step 160, FIG. 14. Second the fibers are oriented at an angle forming an interlocking truss structure within the foam step 162. The fiber tows are stitched, using conventional stitching machines so as to interlock with the woven fabric placed on the foam. This both maintains fabric position and aids in load transfer between the fibers and face sheets as discussed above. Alternatively, a manual process may be used wherein holes are punched in the foam core, fiber or pregreg tows are stitched through the holes and then the remaining plies are laid up, impregnated with resin, and cured. The fabric could be dry woven or could be previously impregnated with resin and B-staged which locks the structure and provides a deliverable core ready for subsequent layup and bonding of the face sheet laminates, step 163. When the sandwich structure is cured, step 164, a portion of each stitch loop will be laminated into the face sheets lying between the woven surface play and the rest of the laminate. This provides a good anchorage to transfer the shear load and also insures that the structural integrity does not depend solely on an adhesive bond to the core. Chain stitch 166, FIG. 15, or lock stitch 168, FIG. 16, patterns may be used, and those skilled in the art will recognize the need for a particular truss arrangement and truss configurations other than that shown at 34, FIG. 4, for various implementations and such configurations, are within the scope of this invention, including other known web and chord arrangements.

Various types of face sheets 2, 4, FIG. 1, and 38, 40, FIG. 4, may be used including dry fiber matting which has yet to be impregnated or prepreg material in which dry fiber is precombined with resin. If dry fiber matting is used, a resin transfer molding method may be used to wet out the dry fiber matting. Using vacuum, gravity, or externally applied pressure, resin may also be urged to seep down along each tow during the cure phase, further increasing the rigidity and strength of each truss member. If prepreg face sheet material is used, autoclaving and related procedures may be utilized to cure a given part. In addition, a carbon phenolic prepreg, autoclave cured, and then subject to several cycles of resin infusion and pyrolysis may be used for the face sheets for high temperature applications. Boron, silicon carbide, tungsten, or carbon pultruded rod stock fibers serving as tows which extend through the resulting carbon phenolic face sheets have also been found to increase thermal conductivity. The tows may be also comprised of dry fiberglass fiber available from Corning or Kevlar fiber available from DuPont having a typical diameter of $\frac{1}{10}$" or a cross sectional area of $6.25(10^{-4})$ sq. in. Titanium and other wire and fiber material or multi filamentary bundles preimpregnated with resin and then cured may also be used.

Various types of core material may be used including thermosetting or thermoplastic polymeric foams, ceramic foams, felts, or fibrous insulations, etc., so long as the core can be penetrated with fiber tows, provides sufficient lateral support to fiber tows to prevent buckling, and does not absorb excessive resin during the cure. "Foam" as used herein is to be given its broadest interpretation meaning a cellular material which has these characteristics. Additionally, in the embodiment of FIG. 12, the core must be of a material which provides for comparison during insertion of the fiber tows (140) into the face sheets.

Figure 17:
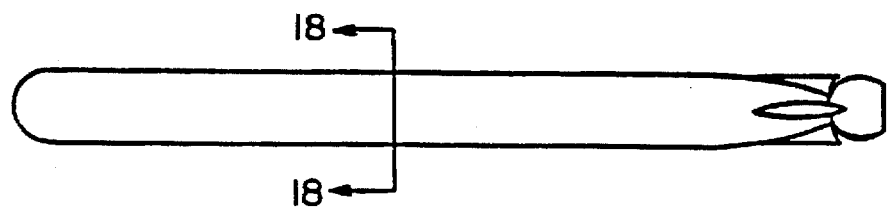
FIG. 17 is a schematic view of a torpedo hull that may be fabricated using the reinforced foam core sandwich structure according to this invention.
Figure 18:
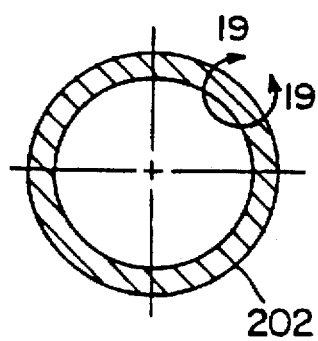
FIG. 18 is a side view taken along line 18—18 of FIG. 17.

Torpedo body 200, FIG. 17, may be fabricated using the reinforced foam core structure of this invention. In such a torpedo hull, radial loads on cross section area 202, FIG. 18, are of primary importance. Radial fibers 204, FIG. 19, extending between face sheets 206 and 208 separated by foam core 210 provide strength in the radial direction. Face sheets 206 and 208 may be graphite face sheets forming the inner and outer hull walls. Radial fibers 204 provide the added structural integrity required. Foam core 210 isolates propeller vibrations and radial fibers 204 undergo lateral displacements when excited by radial pressure disturbances. This motion is dampened by surrounding foam core 210 which has additional energy absorbing capacity. The required amount of fibers to be effective in load transfer is minimal. The values in Table 3, below, indicate that approximately 0.5 percent of boron by area is required to react 85 percent of the radial pressure transfer through the foam.

TABLE 3

| Core | | | | |
|---|---|---|---|---|
| Area Boron Fibers (%) | Boron Fiber Spacing (in.) | Radial Modulus (psi) | Boron Load (%) | Foam Load (%) |
| 0 | 0 | $0.05 \times 10^6$ | 0 | 100 |
| 0.15 | 1/8 | $0.15 \times 10^6$ | 60 | 40 |
| 0.60 | 1/16 | $0.41 \times 10^6$ | 88 | 12 |
| 2.5 | 1/32 | $1.55 \times 10^6$ | 97 | 3 |
| 10 | 1/64 | $6.1 \times 10^6$ | 99 | 1 |

Figure 19:
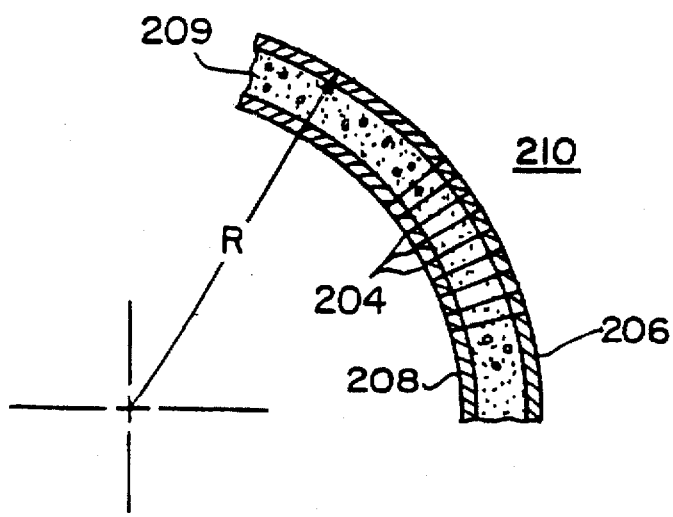
FIG. 19 is a side partial sectional view taken along line 19—19 of FIG. 18.
Figure 20A:
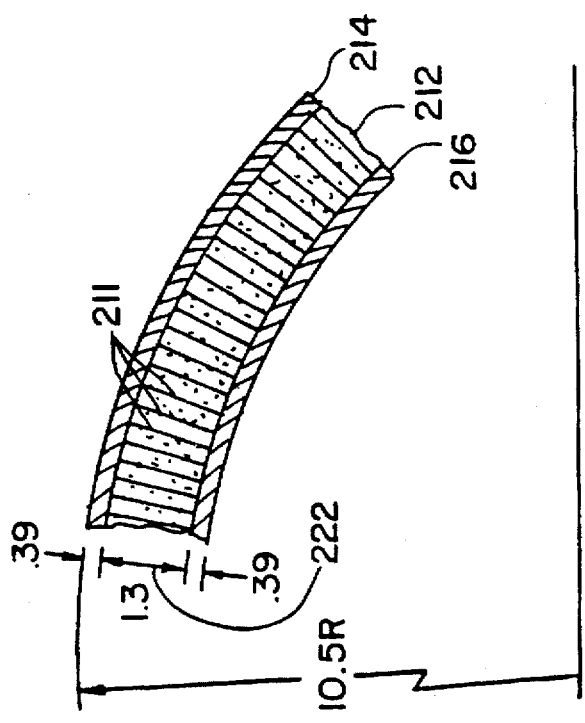
FIGS. 20A–20B are cross sectional views showing first the hull structure as laid up, and second the finished hull.

1) Boron Fiber, 0.0056 in. diam, $E = 60 \times 10^6$ psi
2) Rohacell 300 WF foam, $E = 0.05 \times 10^6$ psi Fabrication of pressure hull structure 210, FIG. 19, is accomplished by embedding boron or other high compressive strength fibers 211, FIG. 20A, in foam core 212 at the desired spacing. Face sheets 214 and 216 are then laid up, and the hull is cured using internal pressure. The foam core 212 is selected such that it compacts in a controlled manner and drives the fibers into both the inner and outer laminates as shown at 218 and 220, FIG. 20B.

This is accomplished using Rohacell closed cell foam which is typically compressed at temperatures from 300° to 350° F. with pressures of approximately 50 to 90 psi. A 40 to 50 percent thickness reduction is common. The foam thickness indicated in FIG. 20A of 1.3 in. as shown at 222 allows for a 45 percent thickness compaction when inserting a total of 0.6 in. of laminate. The choice of foam is dependent on the resin system being used and on the compressive strength requirements of the foam. Boron fibers will typically react to up to 90 percent of the radial pressure. This allows use of lightweight foam having a density of 5 pcf compared with 25 pcf for syntactic foams used in previous hulls. Compression of the foam by up to 50 percent in thickness results in a significant growth in radius for the inner laminate. In the example shown in FIG. 20B, the inner laminate radial growth would require a 2 in. circumferential increase of the laminate. This amount of stretch obviously cannot be accommodated by a wound filament or other continuous structure. The preferred construction of the inner hull would consist of overlapped discontinuous hoop fibers which permit relative motion under cure and allow for circumferential expansion. Unidirectional plies provide the longitudinal reinforcement and do not inhibit the expansion.

Figure 20B:
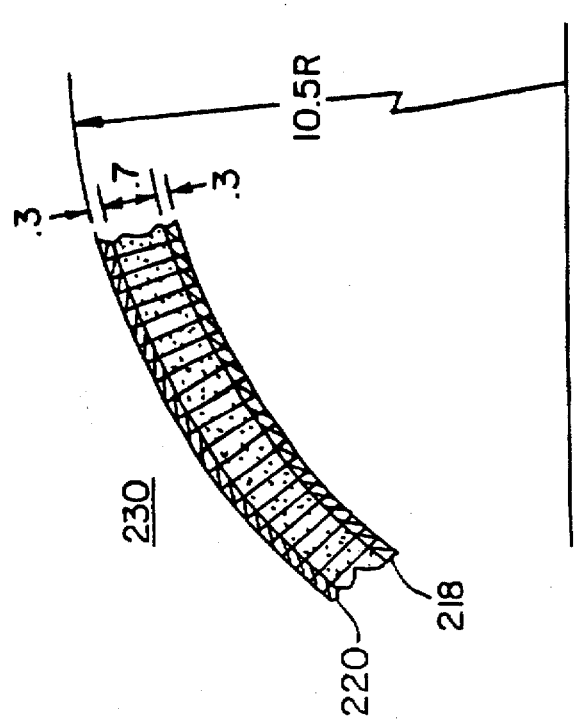
Figure 21:
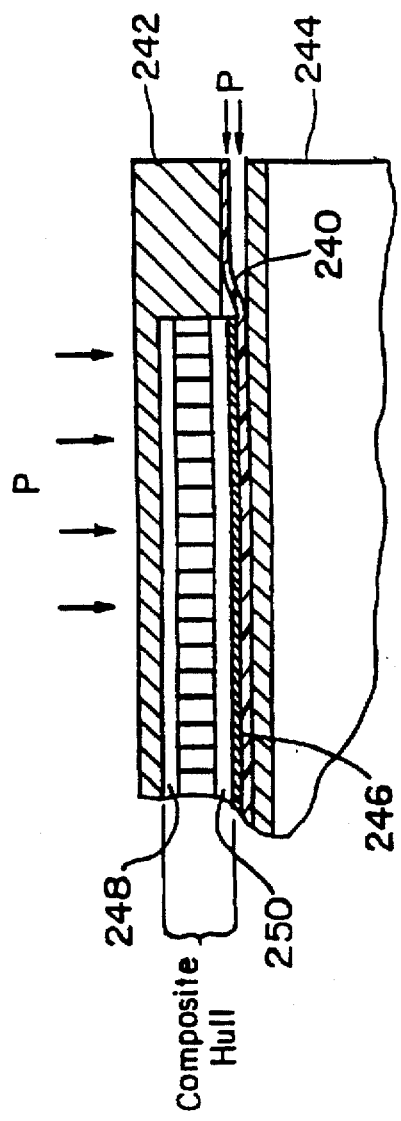
FIG. 21 is a cross sectional schematic view of the tooling used for fabricating the finished hull of FIG. 20B.

In fabricating finished hull 230, FIG. 20B, expandable inner bag 240, FIG. 21, is sealed to external mold 242. Autoclave pressure is introduced between the bag and the inner mold 244 which drives the boron fibers into the outer laminate 248 and the expanding inner laminate 250. Overlapped caul plate 246 is the means for transmitting internal pressure. A closed die external mold is used to maintain control of the outside hull surface and dimensions. The external tool can be a relatively thin structure since the net pressure load on the tool is zero, and is balanced by autoclave pressure. This permits a very low-cost tool.

Although specific features of the invention are shown in some drawings and not others, this is for convenience only as some features may be combined with any or all of the other features in accordance with the invention.

Other embodiments will occur to those skilled in the art and are within the following claims:

What is claimed is:

1. A reinforced foam core sandwich structure comprising:
   opposing multi-layer laminate face sheets;
   a foam core therebetween; and
   a plurality of discrete supporting tow members encapsulated within said foam core forming a support structure therein, at least a number of said tow member extending into said face sheets to anchor the face sheets to the foam core to form a combined foam/tow member core wherein the compressive strength or shear strength of the combined foam/tow member core is greater than the compressive strength or shear strength, respectively, of the foam core alone or the tow members alone.

2. The reinforced foam core sandwich structure of claim 1 in which a number of said tow members form a shear bearing truss structure within said foam core for reinforcing the shear strength of the sandwich structure.

3. The reinforced foam core sandwich structure of claim 2 in which said truss structure includes a number of X-braced members.

4. The reinforced foam core sandwich structure of claim 1 in which a number of said tow members are disposed perpendicularly between said face sheets.

5. A reinforced foam core sandwich structure comprising:
   opposing face sheets;
   a foam core therebetween; and
   a plurality of discrete supporting tow members encapsulated within said foam core forming a support structure therein, at least a number of said tow member extending into said face sheets to anchor the face sheets to the foam core to form a combined foam/tow member core wherein the compressive strength or shear strength of the combined foam/tow member core is greater than the compressive strength or shear strength, respectively, of the foam core alone or the tow members alone.

* * * * *